(12) United States Patent
Ress (10) Patent No.: US 7,756,730 B2
(45) Date of Patent: Jul. 13, 2010

(54) METHOD FOR PROVIDING SINGLE OCCASION LIABILITY INSURANCE

(76) Inventor: Bradford D Ress, 7284 W. Palmetto Park Rd., Suite 105, Boca Raton, FL (US) 33433

( * ) Notice: Subject to any disclaimer, the term of this patent is extended or adjusted under 35 U.S.C. 154(b) by 139 days.

(21) Appl. No.: 11/642,195

(22) Filed: Dec. 20, 2006

(65) Prior Publication Data

US 2008/0154647 A1 Jun. 26, 2008

(51) Int. Cl.
*G06Q 40/00* (2006.01)
(52) U.S. Cl. ........................................................ 705/4
(58) Field of Classification Search ...................... 705/2, 705/4
See application file for complete search history.

(56) References Cited

U.S. PATENT DOCUMENTS

| 5,873,066 | A * | 2/1999 | Underwood et al. ............ 705/4 |
| 6,208,973 | B1 * | 3/2001 | Boyer et al. .................... 705/2 |
| 7,346,525 | B1 * | 3/2008 | Milanovich ..................... 705/4 |
| 2002/0065758 | A1 | 5/2002 | Henley |
| 2002/0077855 | A1 | 6/2002 | Rubenstein |
| 2003/0028406 | A1 | 2/2003 | Herz et al. |
| 2003/0195838 | A1 | 10/2003 | Henley |
| 2004/0186751 | A1 * | 9/2004 | Colavito et al. ................ 705/4 |
| 2004/0236602 | A1 | 11/2004 | Greene |
| 2004/0267579 | A1 | 12/2004 | Markman |
| 2005/0182660 | A1 | 8/2005 | Henley |

* cited by examiner

*Primary Examiner*—Gerald J. O'Connor
*Assistant Examiner*—John A Pauls
(74) *Attorney, Agent, or Firm*—Buckingham, Doolittle & Burroughs, LLP (57) ABSTRACT

Described herein is a method of providing liability insurance covering medical services of a limited scope which includes an insurance provider establishing criteria or guidelines. The insurance provider accepts at least one practitioner into a network wherein the practitioner accepted into the network meets the established criteria or guidelines. The accepted practitioner may then offer elective liability insurance to at least one patient obtaining at least one medical service from the practitioner, wherein the elective liability insurance covers the service and wherein the service is of a limited scope. A management service may act as an intermediary to provide at least one service related to the elective liability insurance to the accepted practitioner and the insurance provider. The patient may accept or deny the elective coverage.

11 Claims, 5 Drawing Sheets

METHOD FOR PROVIDING SINGLE OCCASION LIABILITY INSURANCE

TECHNICAL FIELD

The invention relates generally to a method for providing elective liability insurance for a single occasion or for a limited scope of transactions. More specifically the invention relates to a method of providing supplemental or complete liability insurance to a patient for a single limited scope engagement with a physician.

BACKGROUND OF THE INVENTION

It is common for physicians to invest in liability insurance as a method of risk transference to protect themselves from the financial liability associated with medical malpractice. Physicians wishing to purchase liability insurance often pay a large premium payment in exchange for protection against personal liability to third party claims of malpractice, in accordance with the insurance policies that are determined by contract. Malpractice insurance also protects the patient, ensuring a solvent source for payment of any award of damages due to a successful malpractice claim.

In certain areas of the United States, liability insurance premiums have increased to costs that drive medical practitioners out of business. In some states the situation is creating a lack of necessary medical services, denying patients access to the medical care they require. Many states require a minimum level of insurance be carried to maintain a license within the state, but others do not require that physicians carry liability insurance. Many states that do not require liability insurance require that the physician notify the patient that no liability insurance is available.

Prior art offers few methods of providing insurance coverage for single events or limited scope engagements. U.S. patent application Publication 2004/0267579 describes a method, apparatus and system for providing insurance coverage and claims payment for single event surgical and diagnostic procedures. However, this publication describes a system of providing single event health or death insurance based on the statistical risk of the procedure, including the risk of complications and further hospitalization, rather than providing liability insurance based on the doctor's past history or performance.

Therefore, as shown in the Prior Art, there is still a need for a method to provide elective malpractice liability insurance to protect a patient and physician for a single occasion or limited scope transaction.

SUMMARY OF THE INVENTION

It is an object of this invention to describe a method of providing elective malpractice liability insurance for a single event or limited scope transaction.

It is a further object of this invention to describe a method of providing elective malpractice insurance capable of protecting the doctor from personal liability and ensuring payment of a damage award to a patient for the physician's malpractice while allowing the patient to control the level of risk and payment necessary for such liability insurance.

It is yet another object of this invention to provide a system for the management of elective malpractice liability insurance for a single-event or limited scope transaction between a patient and physician.

The invention provides a method of offering elective malpractice liability insurance wherein the patient desiring services enters into a contract with a physician for the provision of the services at a particular cost, with optional malpractice insurance coverage available for those services at a higher cost. In certain embodiments of the invention the elective insurance may be the only malpractice liability insurance available for the services and in other embodiments of the invention the elective insurance may be supplemental to a base level of provided malpractice insurance. The elective liability insurance may be offered quantitatively, wherein the patient may choose whether to accept or deny a set amount of optional coverage, or qualitatively, wherein the patient may choose the amount or level of coverage desired.

In further embodiments of the invention the offering of the elective insurance may be monitored, controlled or administered by a management or administration company or service. This management or administration company may commonly be a Risk Management Company (RMC). The RMC may be responsible for the recruitment of doctors into the insurance network and may provide forms and rates from the insurance provider. In other embodiments the insurance provider may act as the RMC, implementing the insurance program with physicians and their patients without any intermediate management company.

Throughout this application the terms physician, doctor and practitioner may be used interchangeably and refer to the party offering the medical services to the patient. Further throughout this application the terms administration service, administration company, management service and management company may be used interchangeably to refer to the intermediate company responsible for the control and/or management of this invention between the insurance provider and medical practitioner.

The above mentioned and other objects of the present invention will become more readily apparent from a reading of the following detailed description taken in conjunction with the accompanying drawings wherein like reference numerals indicate similar parts, and with further reference to the appended claims.

BRIEF DESCRIPTION OF THE DRAWINGS

The invention may take form in certain parts and arrangements of parts, numerous embodiments of which will be described in detail in the specification and illustrated in the accompanying drawings which form a part hereof, and wherein.

DETAILED DESCRIPTION OF THE INVENTION

Referring now to the drawings wherein the showings are for purposes of illustrating numerous embodiments of the invention only and not for purposes of limiting the same, the figures illustrate the method of providing elective liability insurance for a limited scope provision of medical services or care.

The invention provides a method of offering elective malpractice liability insurance wherein the patient desiring services enters into a contract with a physician for the provision of the services at a particular cost, with optional malpractice insurance coverage available for those services at a higher cost. The invention at hand offers a patient the ability to choose medical services at a lower cost with little or no malpractice insurance coverage or higher cost medical services wherein the patient is protected by malpractice coverage. The elective malpractice insurance may be available for a single medical service by a specific practitioner or group of practitioners, such as but not limited to a single office visit or single surgical procedure, for example. The elective malpractice insurance may be available for lengthier medical services that are limited in scope but under the care of a specific practitioner or group of practitioners, such as but not limited to medical treatment during the duration of a pregnancy or medical care during the duration of a specific medical condition.

In certain embodiments of the invention the elective insurance may be the only malpractice liability insurance available for the services. In these embodiments, when the patient opts to pay the additional cost for the liability insurance, the medical procedure will be covered by malpractice liability insurance. In situations when the patient opts not to pay the additional cost of liability insurance, no malpractice insurance will cover the services. In other embodiments of the invention the elective insurance may be supplemental to a base level of malpractice insurance already covering the medical services. A certain minimum level of insurance, which may or may not be equal to the amount required by the municipality the doctor is practicing in, may exist covering the medical services whether or not the elective insurance is purchased. In situations where the patient opts to pay the additional cost for the liability insurance, the insurance will be supplemental and in addition to the minimum base level of coverage automatically offered by the physician. In varying embodiments of this invention the physician may require the patient to sign a disclaimer or other waiver protecting the physician from a malpractice suit for more than the value covered by the insurance the patient has elected for the services.

In certain embodiments of the invention the elective liability insurance may be offered quantitatively, wherein the patient may choose whether to accept or deny a set amount of optional coverage. In embodiments wherein the insurance is chosen quantitatively the patient may only choose whether to accept or deny the predetermined level of offered insurance at the predetermined price, and may not choose the level or amount of insurance desired beyond the set amount offered. If the elective insurance is denied the patient will be charged the less expensive predetermined cost of the medical services without any elective malpractice liability coverage. In other embodiments the elective liability insurance may be offered qualitatively, wherein the patient may choose the amount or level of coverage desired. The patient may be given a chart or scale of prices to determine what level or amount of liability insurance is desired for the medical service, if any is desired at all. Optionally, the patient may choose the level of coverage, and then a price may be calculated by the physician or other party involved in the transaction such as but not limited to the insurance provider. If the patient chooses no insurance the less expensive predetermined cost of the medical services without any elective malpractice liability coverage will be charged. If the patient chooses to accept the elective liability insurance, the patient must choose the level of coverage desired, and will be charged the predetermined cost of the medical services in addition to the cost of the level of elective insurance chosen.

A doctor must partner with an insurance provider to offer the elective liability insurance of this method. The insurance provider may sponsor a network of doctors to which it will provide the optional insurance coverage for the doctors to offer to their patients. The insurance provider may use any method for choosing doctors to participate within the insurance system. The insurance provider may use actuarial or other statistical data to analyze risk factors including, but not limited to, the type of medicine practiced by the physician, the physician's past history of malpractice claims or litigation, the location of the physician's practice, and many other factors as desired by the insurance provider. The insurance provider may also provide insurance to a practice group or other group of physicians that have an association with each other such that the whole group or association can provide the optional liability insurance to their patients, if so desired by the insurance provider.

In further embodiments of the invention the offering of the elective insurance from the insurance provider to approved physicians for subsequent offering to their patients may be monitored, controlled or administered by a management or administration service or company. This management or administration company may commonly be a Risk Management Company (RMC), or other company specializing in the administration of insurance and other risk deferral programs. The RMC may be responsible for the recruitment of doctor's into the insurance provider's network and may also provide forms and rates from the insurance provider to the participating physicians. The participating physicians will then in-turn offer the elective liability insurance to their patients. In other embodiments the insurance provider may act as the RMC, implementing the insurance program with physicians and their patients without any intermediate management company.

In certain embodiments of the invention, the appropriate forms will be completed and information gathered from the patient when the patient chooses to accept the optional liability insurance. Patient will commonly make total payment, including the cost of the medical service, the cost of the insurance, and any other necessary costs, to the physician's office or billing service. The completed forms and information, along with the portion of payment covering the cost of the insurance will then be forwarded to the administration company (e.g. the RMC) or directly to the insurance provider, as appropriate for the situation. However, in further embodiments of the invention, the patient may pay the doctor for the medical services and may separately pay the administration service or insurance provider for the cost of the insurance. Other payment arrangements can also be foreseen by this invention, as the patient's personal health insurance or other mechanisms may also pay a portion of or full payment of the elective liability insurance of this invention, for example.

Should the patient bring a claim for malpractice against the physician for a medical service that was covered by the elective insurance of the invention, the elective insurance will protect the physician as liability insurance of prior art does. A non-limiting example may include the filing of a claim by the physician with the administration company or insurance provider as appropriate, the administration company or insurance provider providing a defense attorney for the accused physician, and/or the coverage of the costs of damages assessed due to the cause of action. The function of the elective insurance of this invention may be determined by contract between the patient, physician, administration company, and/or insurance provider.

Figure 1A:
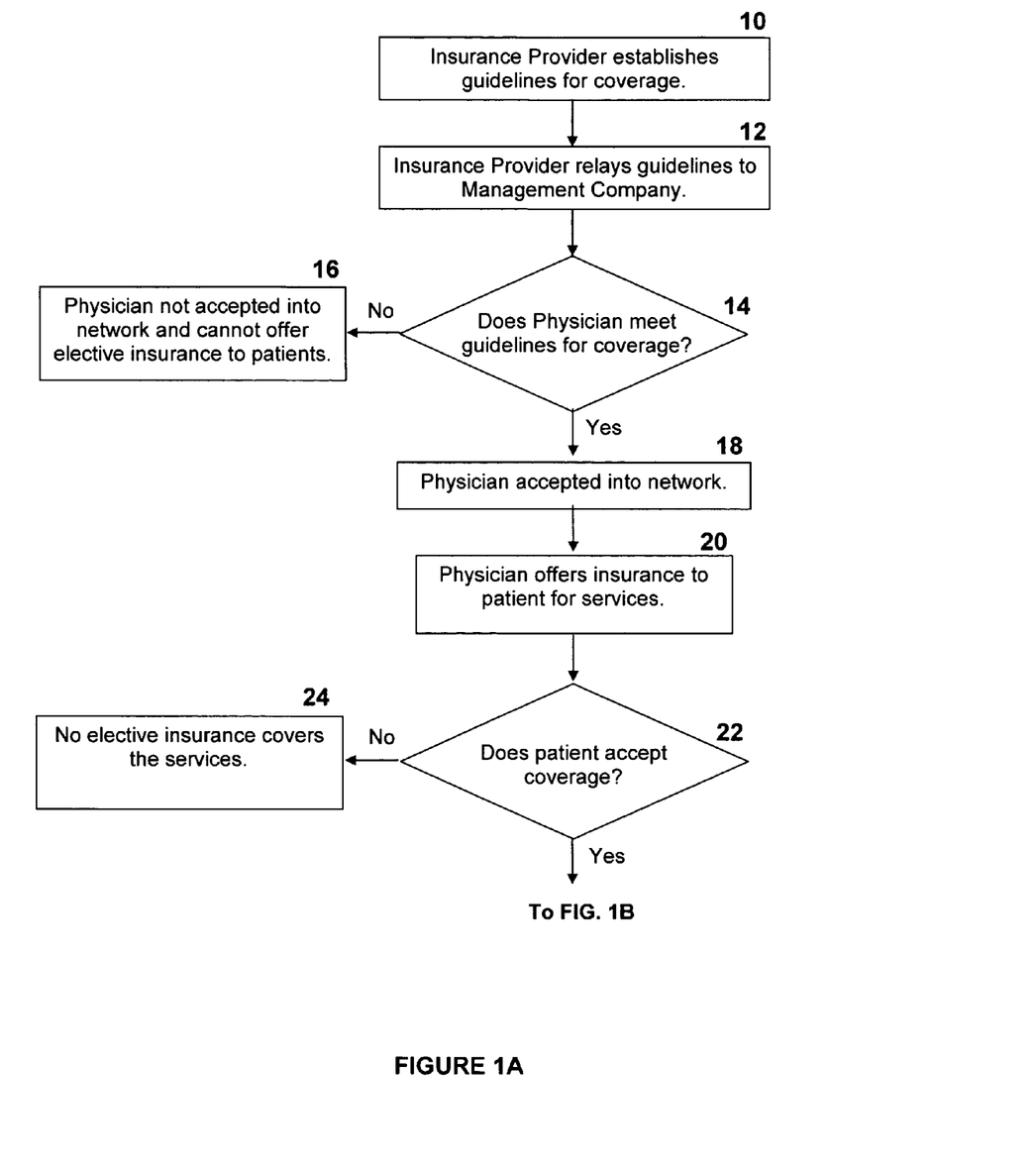
FIGS. 1A and 1B are a flow chart illustrating one embodiment of the method of providing elective liability insurance of this invention, wherein an intermediate management company is used to administer the elective liability insurance.
Figure 1B:
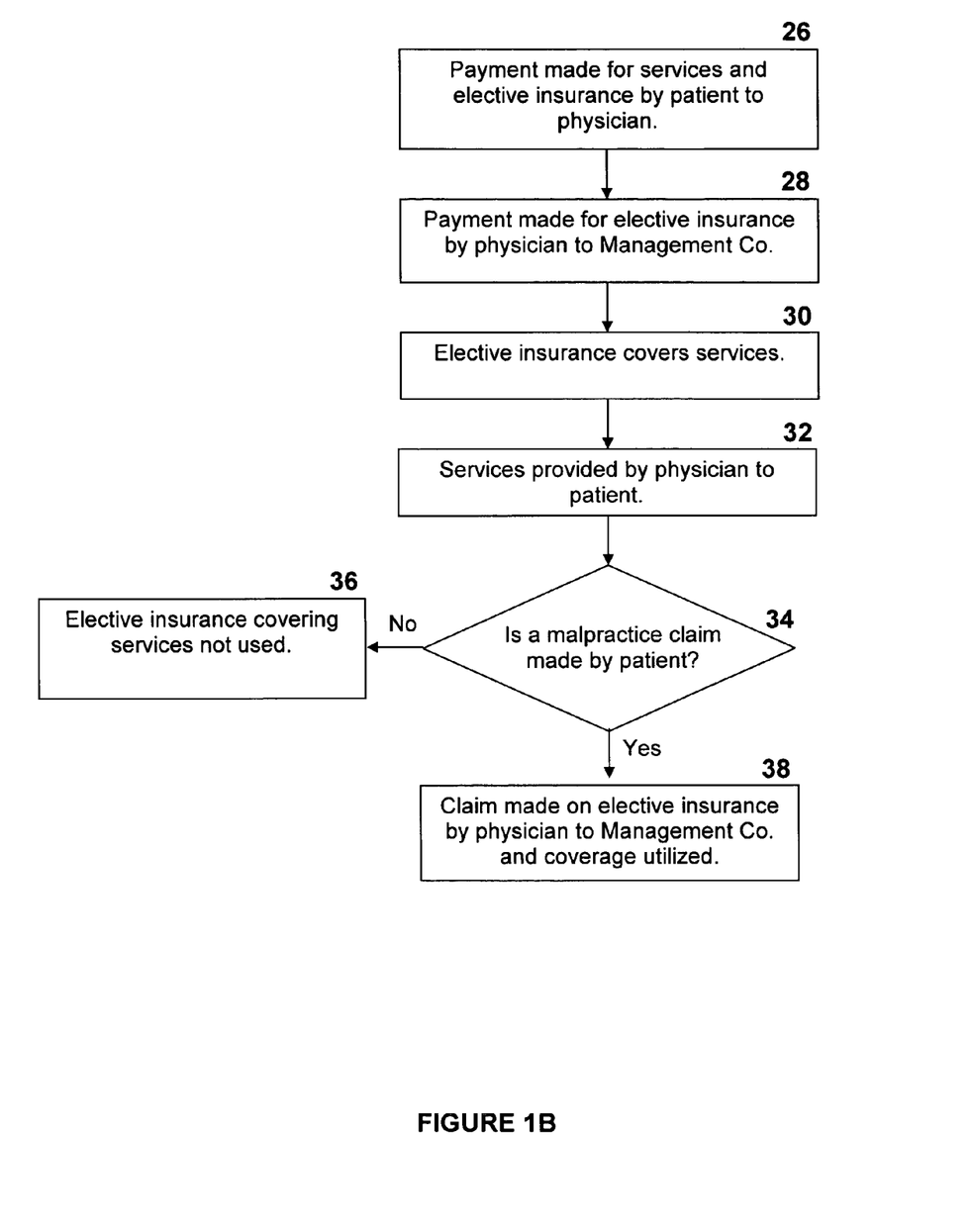

One specific non-limiting embodiment of the invention at hand is shown in FIGS. 1A and 1B. FIGS. 1A and 1B illustrate a flow chart of the method of providing elective liability insurance for limited scope medical services. As shown in step 10 of FIG. 1A, the insurance provider often establishes guidelines and/or restrictions for the offering of the insurance, including but not limited to determining the factors to be analyzed in deciding which physicians will qualify to join the network of physicians that are able to provide the elective insurance described in this invention. The insurance provider will often relay these guidelines to a management company or service, as shown in step 12 of the flow chart.

The physician will then apply to participate in the network, or in other embodiments of the invention the insurance provider or management service may target specific physicians to solicit their participation to subsequently join the network of physicians offering the elective liability insurance. If the guidelines are not met by the physician, the physician will often be restricted from participating in the network and will not be able to offer the elective liability insurance of this invention, as shown in steps 14 and 16. The denial of unqualified physicians may be a benefit to the patient as well, as the patient may question why a physician does not offer elective liability insurance, and may choose to not receive services from physicians who do not qualify to offer the elective insurance. Physicians that meet the guidelines established by the insurance provider may be accepted into the network of physicians able to provide the elective liability insurance to their patients, as shown in step 18 of the flowchart of FIG. 1A.

The physicians may offer the elective insurance to their patients for services the doctor provides, as shown in step 20. The patient must accept or deny the elective coverage (step 22). If a patient does not accept the coverage no elective liability insurance covers the services the doctor provides to the patient, as shown in step 24. If the patient accepts the elective insurance, as shown in step 26 in FIG. 1B, payment is then made by the patient for the medical services and the elective insurance. Payment will often be made directly to the physician or their billing service, but payment for the insurance will subsequently be made to the management company or insurance provider, as shown in step 28. Once insurance is accepted (and possibly after payment is made, however it is foreseeable that payment may be made at a delayed or later time) the elective insurance covers the medical services at issue between the doctor and patient (step 30). The medical services are then provided by the doctor to the patient (step 32). If a claim of malpractice is made regarding the services, the elective insurance coverage would take effect, covering the liability as is well known within the art of liability insurance (steps 34 and 38). If no claim of malpractice is made the coverage is not utilized (step 36).

Figure 2A:
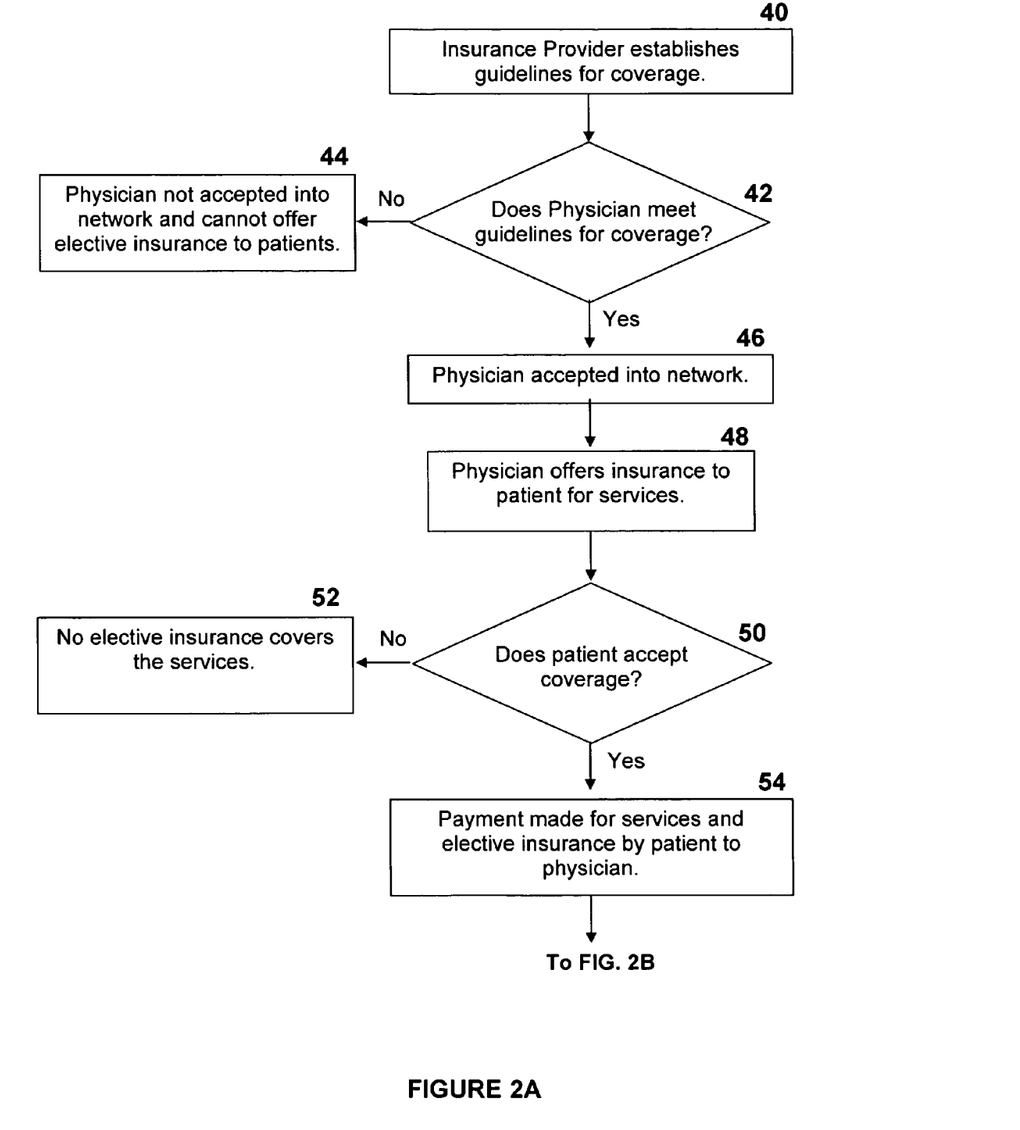
FIGS. 2A and 2B are a flow chart illustrating an additional embodiment of the method of providing elective liability insurance of this invention, wherein no intermediate management company is used to administer the elective liability insurance.
Figure 2B:
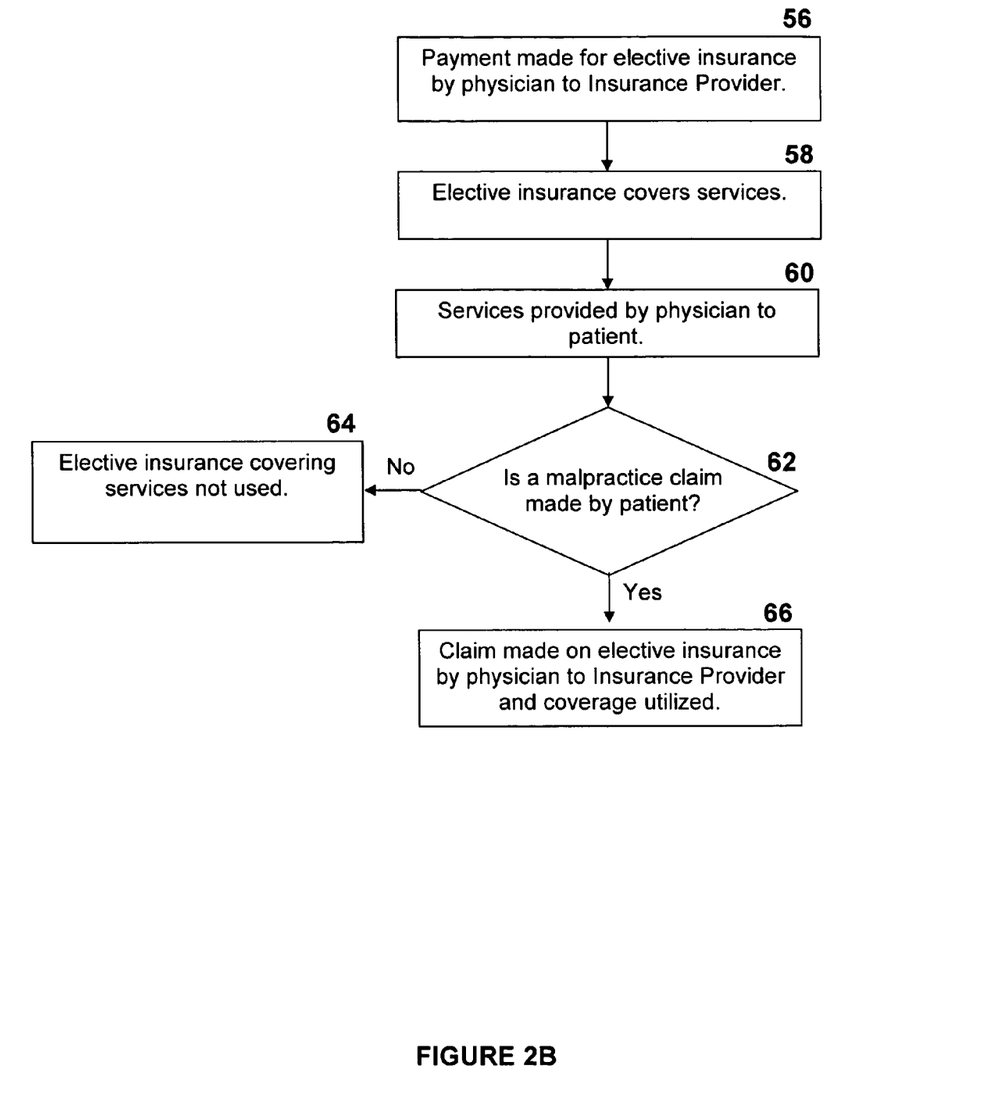

A further non-limiting embodiment of the invention is shown in FIGS. 2A and 2B. The flowchart of FIGS. 2A and 2B show the method of this invention wherein no management company is utilized as an intermediate party to the insurance transaction. The insurance provider establishes the guidelines for acceptance into the network, and directly decides which physicians will be accepted into the network (steps 40-46). The physician offers the insurance to their patients (step 48) and the patient chooses whether to accept coverage (steps 48 and 50). If the patient does not accept the elective insurance than the elective insurance does not cover the medical services (step 52). If the patient does accept the coverage then payment is made for the services and for the elective insurance (step 54). Payment for the elective insurance ultimately is given to the insurance provider (step 56 as shown in FIG. 2B). Elective insurance than covers the services, which are provided by the doctor to the patient (steps 58 and 60). If a malpractice claim is subsequently made by the patient the insurance coverage will act as liability insurance well known within the art (step 62 and 66). If no claim of malpractice is made, the elective insurance coverage is not used (step 64).

Figure 3:
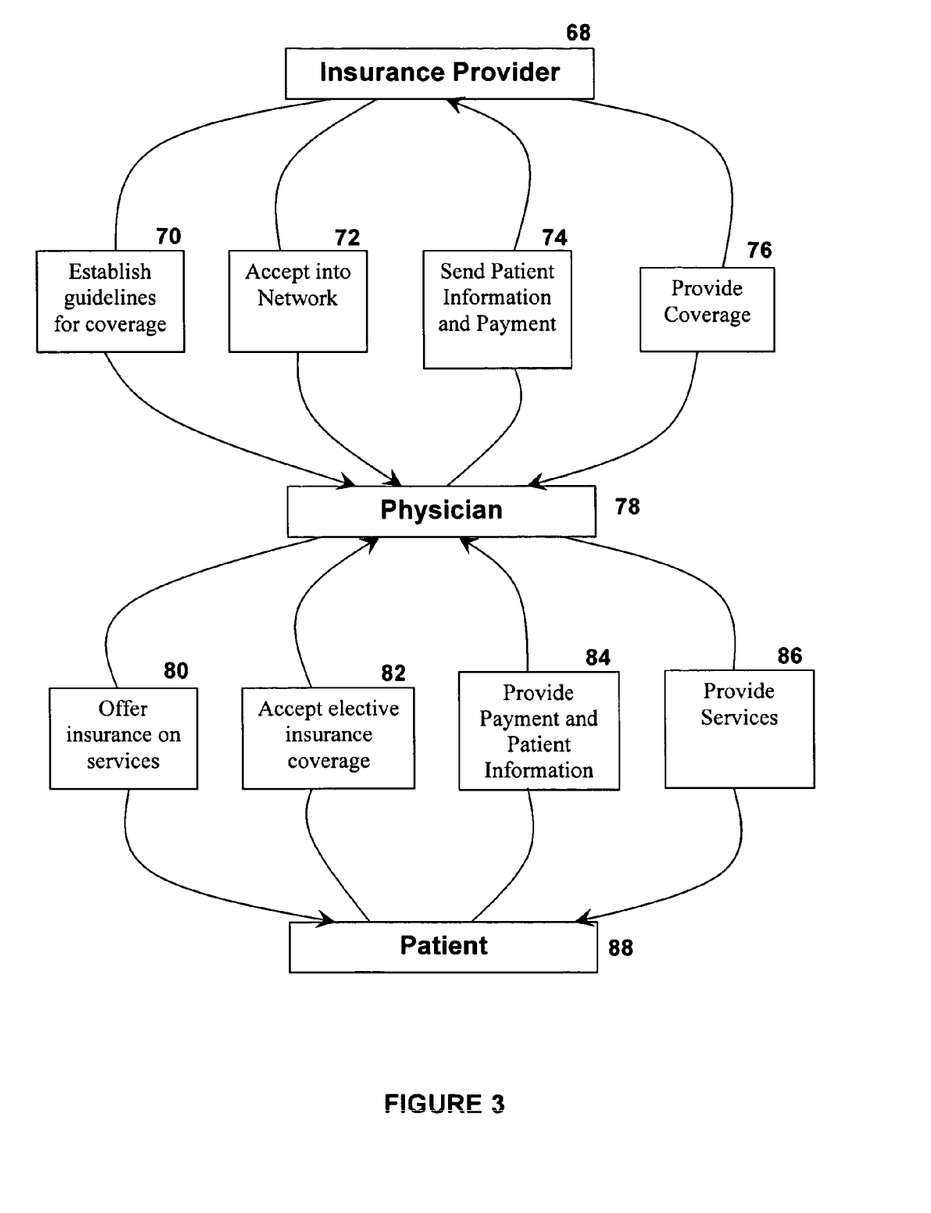
FIG. 3 is a diagram illustrating yet another embodiment of the method of this invention showing the functions of the parties of the invention.

The functions of the parties involved with a further embodiment of this invention are shown in FIG. 3. Insurance provider 68 is responsible for establishing guidelines 70 for coverage of the elective insurance of this invention and accepting physicians 78 into network 72 of qualified practitioners. Physician 78 subsequently offers the elective insurance on their offered medical services 80 to patient 88. Patient 88 may choose whether to accept insurance 82 from physician 78. If coverage is accepted, patient 88 provides payment and patient information 84 to physician 78 who subsequently provides payment and information 74 to insurance provider 68. Insurance provider 68 provides the 11 elective insurance coverage 76 to physician 78 who in turn provides the medical service 86 to patient 88. It is important to note that an intermediate management service may provide any of the functions shown as provided by insurance provider 68.

Described above is a method of providing liability insurance covering medical services of a limited scope which includes an insurance provider establishing criteria or guidelines. The insurance provider accepts at least one practitioner into a network wherein the practitioner accepted into the network meets the established criteria or guidelines. The accepted practitioner may then offer elective liability insurance to at least one patient obtaining at least one medical service from the practitioner, wherein the elective liability insurance covers the service and wherein the service is of a limited scope. A management service may act as an intermediary to provide at least one service related to the elective liability insurance to the accepted practitioner and the insurance provider. The patient may accept or deny the elective coverage.

From the insurance provider's perspective, described above is a method of providing liability insurance covering medical services of a limited scope which includes authorizing at least one practitioner to offer elective liability insurance to at least one patient obtaining at least one medical service from the practitioner. The provider will receive information regarding the at least one medical service provided by the practitioner to the patient wherein the patient has accepted the offered elective liability insurance. The insurance provider will then provide insurance coverage for the medical service provided by the practitioner to the patient, wherein the service is of a limited scope, and wherein the insurance coverage only applies to the limited scope medical service.

From the physician's perspective, described above is a method of providing a liability insurance policy covering medical services of a limited scope which includes receiving authorization from at least one insurance provider to offer elective liability insurance to at least one patient obtaining at least one medical service from the physician. The physician may offer the elective liability insurance to the patient obtaining the medical service. The physician may also transmit information regarding the at least one medical service being provided to the patient wherein the patient has accepted the offered elective liability insurance. The physician will provide the medical service, wherein the service is of a limited scope, and wherein the service is covered by the insurance policy.

In the foregoing description, certain terms have been used for brevity, clearness, illustration and understanding; but no unnecessary limitations are to be implied therefrom beyond the requirements of the prior art, because such terms are used for descriptive purposes and are intended to be broadly construed. Moreover, this invention has been described in detail with reference to specific embodiments thereof, including the respective best modes for carrying out each embodiment. It shall be understood that these illustrations are by way of example and not by way of limitation.

What is claimed is:

1. A method of providing liability insurance covering medical services of a limited scope which comprises:
   employing a processor to execute computer executable instructions stored on a computer readable medium to perform the following acts:
   (a) an insurance provider establishing criteria for accepting practitioners into a network;
   (b) said insurance provider accepting at least one practitioner into a network wherein said practitioner accepted into said network meets said established criteria, and wherein said insurance provider provides said accepted practitioner with elective liability insurance to offer at least one patient; and
   (c) said accepted practitioner offering elective liability insurance to at least one patient obtaining at least one medical service from said practitioner, wherein said elective liability insurance covers said service and wherein said service is of a limited scope, and wherein said elective liability insurance is offered either quantitatively, allowing the at least one patient to choose whether to accept or deny a predetermined amount of said elective liability insurance, or qualitatively, allowing the at least one patient to choose a desired amount of said elective liability insurance; and wherein the elective liability insurance is supplemental to a base level of insurance already covering at least one medical service, the base level of insurance may or may not be equal to an amount required by municipality the practitioner is practicing in and the base level of insurance is not purchased by the patient but automatically provided by the practitioner.

2. The method of claim 1 which further comprises:
   (a) a management service which acts as an intermediary to provide at least one administrative functional service related to said elective liability insurance to said accepted practitioner and said insurance provider.

3. The method of claim 1 which further comprises:
   (a) said patient accepting said offered elective liability insurance; and
   (b) said patient receiving said medical service from said practitioner, wherein said offered elective liability insurance covers said received medical service.

4. The method of claim 3 which further comprises:
   (a) said patient providing payment to said practitioner, wherein said payment consists of payment for said medical service and payment for said elective liability insurance; and
   (b) said practitioner provides payment to said insurance provider for said elective liability insurance.

5. The method of claim 1 which further comprises:
   (a) said patient denying said offered elective liability insurance; and
   (b) said patient receiving said medical service from said practitioner, wherein said offered elective liability insurance does not cover said received medical service.

6. The method of claim 1 wherein said elective liability insurance offered is of a single predetermined level of coverage and a single predetermined price.

7. The method of claim 1 wherein said elective liability insurance offered is of various levels of coverage and various prices.

8. A method of providing liability insurance covering medical services of a limited scope which comprises:
   employing a processor to execute computer executable instructions stored on a computer readable medium to perform the following acts:
   (a) authorizing at least one practitioner to offer elective liability insurance to at least one patient obtaining at least one medical service from said practitioner, wherein said elective liability insurance is offered either quantitatively, allowing the at least one patient to choose whether to accept or deny a predetermined amount of said elective liability insurance, or qualitatively, allowing the at least one patient to choose a desired amount of said elective liability insurance; and wherein the elective liability insurance is supplemental to a base level of insurance already covering at least one medical service, the base level of insurance may or may not be equal to an amount required by municipality the practitioner is practicing in and the base level of insurance is not purchased by the patient but automatically provided by the practitioner;
   (b) receiving information regarding said at least one medical service provided by said practitioner to said patient wherein said patient has accepted said offered elective liability insurance; and
   (c) providing insurance coverage of said medical service provided by said practitioner to said patient, wherein said service is of a limited scope, and wherein said insurance coverage only applies to said limited scope medical service.

9. The method of claim 8 which further comprises:
   (a) utilizing a management service that acts as an intermediary providing at least one administrative functional service related to said elective liability insurance policy.

10. A method of providing a liability insurance policy covering medical services of a limited scope which comprises:
    employing a processor to execute computer executable instructions stored on a computer readable medium to perform the following acts:
    (a) a practitioner receiving authorization from at least one insurance provider to offer elective liability insurance to at least one patient obtaining at least one medical service;
    (b) a practitioner offering said elective liability insurance to said patient obtaining said medical service, wherein said elective liability insurance is offered either quantitatively, allowing the at least one patient to choose whether to accept or deny a predetermined amount of said elective liability insurance, or qualitatively, allowing the at least one patient to choose a desired amount of said elective liability insurance; and wherein the elective liability insurance is supplemental to a base level of insurance already covering at least one medical service, the base level of insurance may or may not be equal to an amount required by municipality the practitioner is practicing in and the base level of insurance not purchased by the patient but automatically provided by the practitioner;

(c) a practitioner transmitting information regarding said at least one medical service being provided to said patient wherein said patient has accepted said offered elective liability insurance; and
(d) a practitioner providing said medical service, wherein said service is of a limited scope, and wherein said service is covered by said insurance policy.

11. The method of claim 10 which further comprises:
(a) utilizing a management service that acts as an intermediary providing at least one administrative functional service related to said elective liability insurance policy.

* * * * *